March 3, 1959 L. H. MORIN 2,875,486
METHOD OF PRODUCING INTERNALLY THREADED MEMBERS
Filed April 14, 1952
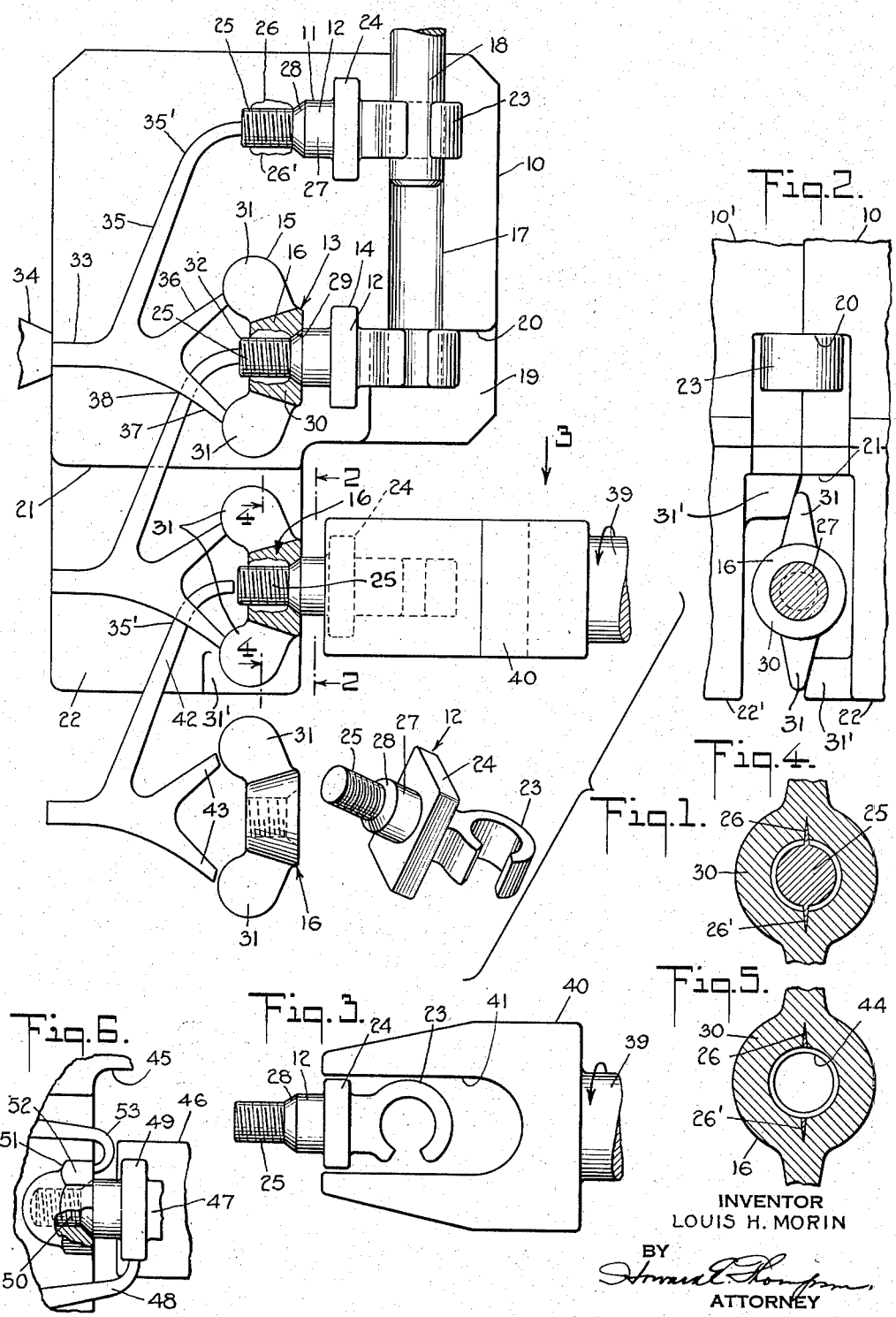
INVENTOR
LOUIS H. MORIN
BY
ATTORNEY

United States Patent Office 2,875,486
Patented Mar. 3, 1959

2,875,486

METHOD OF PRODUCING INTERNALLY THREADED MEMBERS

Louis H. Morin, Bronx, N. Y.

Application April 14, 1952, Serial No. 282,229

8 Claims. (Cl. 22—200)

This invention relates to a method of producing internally threaded members, such as winged nuts, capped nuts and the like. More particularly, the invention consists in a method, wherein a disposable core is first cast in one impression, or cavity, of a die to include a threaded part, then to move this core into an associated cavity of the die and to form, on the threaded portion of the core, a member such, for example, as a winged nut and, then, to move the united parts into a separating station, in which the nut member is held against rotation and the core member rotated to remove the core and complete the formation of the threaded bore in said nut member and, finally, to then move the internally threaded member to a trimming station.

Still more particularly, the invention deals with a method of the character described, wherein the threaded portion of the core includes flares enveloped by and finally formed in the resulting internally threaded member.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic extended view illustrating the successive stages of operations for producing an internally threaded member, such for example, as a winged nut.

Fig. 2 is a partial section on the line 2—2 of Fig. 1 showing the winged nut in a different position and omitting part of the construction.

Fig. 3 is a view looking in the direction of the arrow 3 of Fig. 1 and omitting the nut shown in Fig. 1.

Fig. 4 is a partial section on the line 4—4 of Fig. 1 on an enlarged scale.

Fig. 5 is a section, similar to Fig. 4, but taken through the winged nut after the core has been removed; and Fig. 6 is a view similar to the lower portion of Fig. 1 showing only a part of the construction and showing a modification.

In Fig. 1 of the accompanying drawing, I have diagrammatically shown one adaptation of my invention and, in said figure, 10 represents one part of a die illustrating the same on the parting line and, in Fig. 2, at 10' I have illustrated a portion of the companion die. The adjacent surfaces of these dies are fashioned to form two mold cavities and, as the cavities are shown only on the die 10, the brief description of one will be applicable to both.

The upper portion of the die has a cavity 11 for forming a disposable core 12. Below the cavity 11 is another cavity 13 having a portion 14 for reception of the core 12 and a portion 15 for forming, for example, a winged nut product 16.

The die 10 also has a vertical aperture, or bore, 17 for a supplemental core pin 18 which also acts as a feed pin for delivering the core 12 from the cavity 11 to the cavity 13, the die being recessed, as at 19, to form a shoulder portion 20 utilized in stripping the pin 18 from the core 12, as later described.

The die also includes a recessed or channelled portion 21, note Fig. 2, formed by depending walls 22, 22' and this recess 21 forms what may be termed a channel or fork engaging the winged nut product 16 in the manner seen in Fig. 2 in the operation of removing the core 12 from the product 16, as later described.

In forming the core 12, this core comprises an open ring portion 23 shown in elevation in Fig. 1, which ring portion partially envelops the pin 18. Inwardly of the ring portion is a square or angular portion 24, the other end of the core being fashioned to form a threaded stud 25 and at 26, 26' is represented a flash on the parting line of the dies. The threaded stud joins the body portion 27 of the core 12 in a bevelled wall portion 28, the latter forming a counter-sunk recess 29 in the nut 16, as clearly seen in Fig. 1 of the drawing.

The cavity portion 15 is fashioned to form a slightly conical nut body 30 with oppositely disposed curved wing portions 31. The cavity portion 15 is also shaped, as seen at 32, to receive the end of the threaded stud 25 when the precast core 12 is positioned in the portion 14 of the cavity 13.

At 33 I have shown a primary gate or sprue passage of the dies, into which molten metal is pressure injected through a nozzle, diagrammatically seen at 34. The sprue has three branches, 35, 36 and 37. The branch 35 opens into the cavity 11 at the end of the threaded stud 25 and at least the upper portion 35' of this sprue will be preferably formed only in the surface of the die 10; whereas, the sprue branch 37 is formed only in the surface of the die 10' so that these sprue portions will cross one another, as indicated at 38, when the cast parts are shifted into the different positions, as is later described.

At 39 I have shown an intermittently rotatable shaft having a forked or yoke-shaped end 40, note Fig. 3, adapted to engage the angular or square portion 24 of the core 12 in rotating said core to disengage the same from the winged nut 16, as later described. The recessed portion 41 of the yoke end 40 is of sufficient length to provide movement of the core outwardly with respect to the nut to facilitate disengagement of the parts, as shown at the lower portion of Fig. 1, wherein the core part is shown detached from the nut part.

In operation and at each pressure charge of casting or molding material into the cavities of the dies, a core part 12 is formed in the cavity 11 and a nut part 16 formed in the cavity 13 by passage of the heated material through the sprues 35, 36 and 37. The core 12 is formed on the lower end of the pin 18. After this injection charge into chilled dies, the castings are immediately formed, the dies are then opened, the core part 12 is moved downwardly by the pin 18 into registering position with the cavity portion 14, the dies are then closed, or partially closed, the pin 18 stripped from the open ring 23 and returned to its original position, as shown in full lines in Fig. 1. Thereupon, the dies are again closed and the second successive casting is formed. In this last operation, the nut part 16 is formed directly upon the first cast core part 12. Then, in bringing the second cast core part into the lowered position in cavity 13, the first assembled or united parts 12 and 16 are moved into the third station, which may be termed the separation station, and during the operation of forming the next cast nut 16 on the second cast core 12, the shaft 39 will be rotated to unscrew the core 12 from the nut 16, the nut 16 being held against rotation by engagement of wings 31 with lugs 31', as seen in Fig. 2 of the drawing.

In the last mentioned shifting of the united parts, it will be understood that the rectangular portion 24 is moved into the channel 41 of the yoke end 40, as is illustrated in Fig. 1 of the drawing.

In the last mentioned operation of rotating the core 12, it will be understood that the gate portion 42, formed by the sprue 35, 35', will be automatically detached or severed from the core 12 and, after the separation of the core 12 from the nut 16, the gates 43 will be trimmed from the wings 31 to produce the resulting winged nut product 16.

In forming the threaded stud end 25 of the core 12, a slight flash 26, 26' of casting material may prevail on the parting line and this flash, if formed, will be completely embedded in the body portion 30 of the nut 16, as clearly indicated in Figs. 1, 4 and 5 and, in turning the core 12, the flash will be severed and a clean threaded bore 44 will prevail in the body 30 of the nut 16. It will also be understood that, by forming the open ring 23 on the core 12 by the construction of the dies, excessive seizure of this ring on the pin 18 is obviated. In other words, no excessive resistance will prevail in the stripping operation above described.

In Fig. 6 of the drawing, I have diagrammatically shown a modification and, in this figure, 45 represents a small portion of the lower forked end of a pair of dies which would be equivalent to showing the parts in the third or separating station, as noted in Fig. 1 of the drawing. 46, in the same sense, represents one side of a yoke, similar to the yoke 40.

In Fig. 6, I have indicated at 47 a core part which is substantially identical with respect to the part 12 with the exception that the gate 48 extends into the square or angular portion 49 of the core, rather than into the end of the threaded stud part, which is shown at 50. Again, at 51 I have shown what is commonly referred to as a cap nut. In other words, the lower cavity of the die will be fashioned to form a nut of this type and kind and it will be understood that the hexagon portion 52 of this nut will fit between walls, such as 22, 22' of Fig. 2 in preventing rotation of the nut 51 when the core 47 is rotated by the yoke 46, again as with the construction shown in Fig. 1.

At 53 is shown a gate leading to a surface of the nut 51 and this gate will be trimmed from the nut 51, after the core 47 has been removed.

In referring to the core 12—47 as a disposable core, it is disposable in the sense that it is removed from, or disposed with respect to, the inwardly threaded part, such as the nut-like bodies disclosed. This core, however, may be shaped to form at least part of a secondary product which may have a use in conjunction with or independent of the nut which is formed. On the other hand, if the core is not to have a commercial use, this core is remelted and again utilized in the production of other castings. It will be understod that the method is performed in a successive series of operations of a machine and, as the temperature of the parts in the cavity 13 and at the third or separating station will be substantially the same, in other words, excessive chilling of one part relatively to the other has not taken place, no difficulty will be experienced in unthreading the core part from the nut part. High speed production is possible, it being contemplated that only a fraction of a second will be required to produce each nut part.

In connection with the shaping of the core part to form a secondary product, it will be understood that at least some portion of this core part will be shaped to facilitate engagement with an intermittently rotatable member to facilitate detachment of the core part from the internally threaded part which is formed thereon.

In carrying out the method, it will be understood that, after a predetermined number of revolutions, the yoke 40—46 comes at rest with the recessed portion thereof directed vertically so that the core part can be fed down into the recess of the yoke, while the latter is at rest. It will be apparent that, in accordance with my method, the production of internally threaded members, such as nuts of the kind defined, can be accurately and economically produced, dispensing with secondary operations such as threading as has heretofore been customary. In the formation of various internally threaded products, or articles, in accordance with the method herein disclosed, means will be provided to hold or engage the core, as well as the article or the product, and relative rotation will be provided between the core and product at a separating station in unthreading or separating the parts, including rotation of the core alone, as is preferable, or of the product, or of both.

Having full described my invention, what I claim as new and desire to secure by Letters Patent is:

1. The method of producing an internally threaded die formed article, which consists in pressure injecting material simultaneously into spaced cavities of a pair of dies, forming on a transfer pin in one cavity a part including an externally threaded end, moving said pin to feed said part into registering position with another cavity of the die, forming around the threaded end of said part, said article in said second cavity, said part and said article having substantially the same temperature in said second cavity, thereby producing a united assemblage of the first part and article, then delivering the united assemblage to a separating station spaced with respect to the last cavity, and unthreading the first part from the article at said station, said part and said article having substantially the same temperature at said separating station.

2. The method of casting an article having internal threads which comprises forming an externally threaded core pin around a transfer rod in a first cavity of a pair of relatively movable dies by injecting casting material to said cavity, opening the dies, moving the rod having the cast core pin thereon to position the pin in a second cavity of the dies spaced from the first cavity, moving the dies towards each other to engage and hold the cast pin, stripping the rod from the cast pin and returning said rod to its original position, then with the dies closed injecting casting material about the core pin in the second cavity to form said article about said pin, said article being internally threaded by the pin, said pin and said article having substantially the same temperature in said second cavity, casting a second core pin about the transfer rod in the first cavity coincidently with the casting of said article in the second cavity, said second core pin being connected to the article by means of gates, opening the dies, moving the interengaged article and core pin to a separating station adjacent the second cavity and at the same time moving the transfer rod and the second cast core pin to position the latter in the second cavity, separating the article from the engaged core pin by rotating the pin to unthread it from the article, said pin and said article having substantially the same temperature at said separating station, and coincidently with said unthreading step casting an article about the second cast core pin.

3. The method of casting an article having internal threads which comprises forming an externally threaded core in a first cavity of a pair of relatively movable dies by injecting heated casting material to said cavity, moving the cast core to a second cavity of the dies spaced from the first cavity, injecting heated casting material about the core in the second cavity to form said article about said core, said article being internally threaded by the core, said core and said article having substantially the same temperature in said second cavity, and separating said article from the engaged core by unthreading one from the other, said core and said article having substantially the same temperature during said unthreading step.

4. The method of producing an article having internal threads which comprises casting an externally threaded core in a cavity of a pair of relatively movable dies by injecting casting material to said cavity, moving the cast core to a second cavity, injecting casting material about the core to form said article thereon, said article being internally threaded by the core, said core and said article having substantially the same temperature in said second cavity, and separating said article from the engaged core by unthreading one from the other, said core and said article having substantially the same temperature during said unthreading step.

5. The method of successively forming articles having internal threads by die casting the articles on externally threaded cores, a core being employed for each article and being cast in the same dies as the article, said core being separable from the article formed thereon and disposable, which comprises casting a first externally threaded core in a first cavity of a pair of relatively movable dies by injecting casting material to said cavity, opening the dies, moving the cast core to a second cavity of the dies spaced from the first cavity, closing the dies and injecting casting material thereto to form an internally threaded article encircling said threaded core while coincidently forming a second threaded core in the first cavity, said first core and said article having substantially the same temperature in said second cavity, said article being formed of the same casting material as the core on which it is cast, opening the dies, moving the interengaged article and core to a separating station adjacent the second cavity and at the same time moving the second core to the second cavity, and separating the article from the engaged core by unthreading the core from the article, said first core and said article having substantially the same temperature at said separating station.

6. The method of forming an article having internal threads by die casting the article on an externally threaded core, the core being cast in the same dies and of the same casting material as the article, which comprises casting an externally threaded core in a first cavity of a pair of relatively movable dies by injecting casting material to said cavity, moving the cast core to a second cavity of the dies spaced from the first cavity, closing the dies and injecting casting material thereto to form said article around the threaded core, said core and said article having substantially the same temperature in said second cavity, opening the dies, moving the interengaged article and core to a separating station, and separating the article from the engaged core by unthreading one from the other, said core and said article having substantially the same temperature at said separating station.

7. The method of successively forming articles having internal threads by die casting each article around an externally threaded core, said core being cast in the same dies as an article and being separable from the article formed thereon and disposable, which comprises casting a first externally threaded core on a transfer rod in a first cavity of a pair of relatively movable dies by injecting molten casting material to said cavity, opening the dies, moving the cast core to a second cavity of the dies spaced from the first cavity by moving said rod, closing the dies, stripping the rod from the core and returning the rod to its original position, injecting casting material to the dies to form an internally threaded article encircling said threaded core while coincidently forming a second threaded core on the transfer rod in the first cavity, said article and second core being connected by gates, said first core and said article having substantially the same temperature in said second cavity, said article being formed of the same casting material as the core on which it is cast, opening the dies, moving said rod to move the interengaged article and core to a separating station adjacent the second cavity and to coincidently move the second core to the second cavity, separating the article from the engaged core by rotating the core to unthread it from the article, said first core and said article having substantially the same temperature during said unthreading step and continuing to cast successive articles and cores in said second and first cavities, respectively, and to separate interengaged articles and cores at said separating station substantially as described.

8. The method of forming an article having internal threads by die casting the article on an externally threaded core, the core being cast in the same dies and of the same casting material as the article, which comprises casting an externally threaded core on a transfer rod in a first cavity of a pair of relatively movable dies by injecting casting material to said cavity, said core being formed with a split ring portion for attaching the same to the rod, moving the core by means of said rod to a second cavity of the dies spaced from the first cavity, closing the dies and injecting casting material thereto to form said article around the core, said core and said article having substantially the same temperature in said second cavity, opening the dies, moving the interengaged article and core to a separating station, and separating the article from the engaged core by unthreading one from the other, said core and said article having substantially the same temperature at said separating station.

References Cited in the file of this patent

UNITED STATES PATENTS

| | | |
|---|---|---|
| 2,234,185 | Marinsky et al. | Mar. 11, 1941 |
| 2,266,432 | Morin et al. | Dec. 16, 1941 |
| 2,391,527 | Tracy | Dec. 25, 1945 |
| 2,577,350 | Morin | Dec. 4, 1951 |
| 2,581,854 | Gries et al. | Jan. 8, 1952 |
| 2,607,446 | Rosan | Aug. 19, 1952 |